(12) United States Patent
   Intelmann et al.

(10) Patent No.: US 12,625,117 B2
(45) Date of Patent: May 12, 2026

(54) QUALITY CONTROL TOOLS FOR LC-MS

(71) Applicant: Roche Diagnostics Operations, Inc., Indianapolis, IN (US)

(72) Inventors: Daniel Intelmann, Schaftlach (DE); Julian Michely, Munich (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 751 days.

(21) Appl. No.: 17/930,616

(22) Filed: Sep. 8, 2022

(65) Prior Publication Data

US 2023/0003696 A1      Jan. 5, 2023

Related U.S. Application Data

(63) Continuation of application No. PCT/EP2021/056470, filed on Mar. 15, 2021.

(30) Foreign Application Priority Data

Mar. 16, 2020    (EP) .................................... 20163293

(51) Int. Cl.
   *G01N 30/62*         (2006.01)
   *G01N 30/02*         (2006.01)

(52) U.S. Cl.
   CPC ....... *G01N 30/62* (2013.01); *G01N 2030/027* (2013.01); *G01N 2030/626* (2013.01)

(58) Field of Classification Search
   CPC ............. G01N 30/62; G01N 2030/027; G01N 2030/626; G01N 30/7233; G01N 30/8631; G01N 2030/045
   See application file for complete search history.

(56) References Cited

U.S. PATENT DOCUMENTS

| | | |
|---|---|---|
| 8,829,429 B2 | 9/2014 | Geyer et al. |
| 11,644,448 B2 | 5/2023 | Maekawa et al. |

(Continued)

FOREIGN PATENT DOCUMENTS

| | | | |
|---|---|---|---|
| CN | 105203664 A | * | 12/2015 |
| CN | 109596596 A | | 4/2019 |

(Continued)

OTHER PUBLICATIONS

Office Action; Japanese Patent Office; Japanese Application No. 2022-550999; Sep. 19, 2023; 4 pages.

(Continued)

*Primary Examiner* — Waqaas Ali
(74) *Attorney, Agent, or Firm* — Taft Stettinius & Hollister LLP

(57)         ABSTRACT

A method for identifying and/or verifying at least one analyte peak in a chromatogram of a sample for said analyte from a liquid chromatography mass spectrometer device, said method comprising: a) determining a chromatogram of the sample by acquiring a plurality of data points for quantifier signal intensities and/or qualifier signal intensities, over time; and, in case the sample comprises an internal standard, optionally acquiring a plurality of data points for internal standard quantifier signal intensities and/or internal standard qualifier signal intensities, over time; b) determining for at least a fraction of the data points acquired in step a), a ratio type; c) comparing the ratios determined in step b) to a reference; and d) identifying and/or verifying at least one analyte peak in a chromatogram based on comparison step c).

26 Claims, 4 Drawing Sheets

(56) References Cited

U.S. PATENT DOCUMENTS

2012/0187284 A1      7/2012  Geyer et al.
2017/0067864 A1*  3/2017  Kudo .................. H01J 49/0036
2020/0372973 A1*  11/2020  Serie ...................... G16B 40/20
2023/0296570 A1*  9/2023  Tuytten ................. G01N 30/88
                                                                            436/65

FOREIGN PATENT DOCUMENTS

DE          112017007538  T5       1/2020
EP                3425369  A1       1/2019
JP            2011242255  A     12/2011
JP            2012530918  A     12/2012
WO            2018229811  A1     12/2018
WO        WO-2019155057  A2 *   8/2019   ......... G01N 33/6848

OTHER PUBLICATIONS

International Search Report issued Jun. 24, 2021, in Application No. PCT/EP2021/056470, 3 pp.
Moussa, Fadl et al., LC-MS/MS method for the determination of hormones: Validation, application and health risk assessment in various bovine matrices, Food and Chemical Toxicology, 2020, 10 pp., vol. 138.
Oberacher, Herbert et al., A European proposal for quality control and quality assurance of tandem mass spectral libraries, Environmental Sciences Europe, 2020, 19 pp., vol. 32, No. 43.
Written Opinion of the International Searching Authority, European Patent Office, International Patent Application No. PCT/EP2021/056470, Sep. 23, 2021, 7 pages.
International Preliminary Report on Patentability, The International Bureau of WIPO, International Patent Application No. PCT/EP2021/056470, Sep. 29, 2022, 8 pages.

* cited by examiner

QUALITY CONTROL TOOLS FOR LC-MS

CROSS-REFERENCE TO RELATED APPLICATIONS

This application is a continuation of International Patent Application No. PCT/EP2021/056470, filed 15 Mar. 2021, which claims priority to European Patent Application No. 20163293.2, filed 16 Mar. 2020, the disclosures of which are hereby incorporated by reference in their entirety.

TECHNICAL FIELD

The disclosure relates to a method for identifying and/or verifying at least one analyte peak in a chromatogram of a sample from a liquid chromatography mass spectrometer device, to a method of quality control applying the aforesaid method, and to systems and computer program products related thereto.

BACKGROUND

For LC-MS assays, ratios of peak areas are the common way for obtaining calculations or verifications. They are part of several international guidelines for validation of mass spectrometric assays, such as those by the CLSI (Clinical and Laboratory Standards Institute), the EMA (European Medicines Agency), or the GTFCh (German society for toxicological and forensic chemistry). For the quality assurance of an assay, non-extracted system suitability tests with spiked compounds, measured before the analytical run, have to fulfill acceptance requirements, such as minimal absolute peak areas or maximal retention time deviation from a target value. Within the analytical run, quality control (QC) samples are then tested with a certain frequency and the calculated result checked versus an acceptance range. Moreover, retention time, peak width (given by the retention time difference between the peak boundaries), absolute peak area of the internal standard (ISTD), and the quantifier/qualifier peak area ratio of the analyte are usually monitored in each sample and should fulfill acceptance requirements of maximal deviations or certain cut-offs values. However, most of these parameters are based on peak integration.

Peak boundaries, detection of interferences, and calculation of the result are all directly dependent on the peak integration. However, noisy background (e.g., due to aged MS source) or tailing peaks (e.g., due to aged LC column) can lead to improper peak integration. Determination of peak boundaries is usually defined as the outer points of retention times of the integrated peak and thus consequently affected by improper peak integration. The peak area ratio of two different transitions of the same analyte (e.g., quantifier/qualifier ratio) is used for verifying the peak identity and to exclude interferences. This principle is due to the fact that the peak area ratio of different analyte's transitions deviates around a fixed value which is independent from the analyte concentration. However, this value cannot only be altered by detection artefacts of individual mass transitions, i.e., interferences, but also by improper peak integration. A clear differentiation of both issues is not possible by monitoring these peak area ratios alone and thus frequently requires manual peak review by an expert. In case of the peak areas of the analyte and the internal standard (ISTD), the ratio thereof (analyte/ISTD ratio) leads to the calculation of the result, i.e., the desired concentration. As the result calculation is directly dependent on peak integration, failures thereof will affect the result immediately.

Furthermore, failures in the peak integration are quite common due to immature integration procedures and these failures cannot automatically be distinguished from the respective system failures. Therefore, manual peak review by an expert is often needed. This peak review on the other hand strongly depends on the experience of the operator and increases human workload. Alternative procedures with parameters independent from the peak integration are therefore desirable for verification.

Nonetheless, there is still a need in the art for means and methods assisting in ensuring correctness of peak identification and result calculation in LC-MS measurements.

SUMMARY

In accordance with one embodiment of the present disclosure, a method for identifying and/or verifying at least one analyte peak in a chromatogram of a sample for said analyte from a liquid chromatography mass spectrometer device is provided, said method comprising the following steps: a) determining a chromatogram of the sample by acquiring a plurality of data points for quantifier signal intensities and/or qualifier signal intensities, over time; and, in case the sample comprises an internal standard, optionally acquiring a plurality of data points for internal standard quantifier signal intensities and/or internal standard qualifier signal intensities, over time; b) determining for at least a fraction of the data points acquired in step a), a ratio type selected from the list consisting of (i) analyte quantifier to analyte qualifier ratios, (ii) internal standard quantifier to internal standard qualifier ratios, (iii) analyte quantifier to internal standard quantifier ratios, and (iv) analyte qualifier to internal standard qualifier ratios; c) comparing the ratios determined in step b) to a reference; and d) identifying and/or verifying at least one analyte peak in a chromatogram based on comparison step c).

In accordance with another embodiment of the present disclosure, a method for identifying and/or verifying at least analyte peak in a chromatogram of a sample comprising an internal standard for said analyte from a liquid chromatography mass spectrometer device, said method comprising the following steps: a) determining a chromatogram of a sample by acquiring a plurality of data points for quantifier signal intensities and, optionally, qualifier signal intensities, over time; b) determining for at least a fraction of the data points acquired in step a), a ratio type selected from the list consisting of (i) analyte quantifier to analyte qualifier ratios, (ii) internal standard quantifier to internal standard qualifier ratios, (iii) analyte quantifier to internal standard quantifier ratios, and (iv) analyte qualifier to internal standard qualifier ratios; c) comparing the ratios determined in step b) to a reference; and d) identifying and/or verifying at least one analyte peak in a chromatogram based on comparison step c). Methods, systems, and computer program products related thereto are also described herein.

Although the embodiments of the present disclosure are not limited to specific advantages or functionality, it is noted that in accordance with the present disclosure a method for identifying and/or verifying at least one analyte peak in a chromatogram of a sample for said analyte from a liquid chromatography mass spectrometer device is provided, said method comprising the following steps:

a) providing, in an embodiment determining, a chromatogram of the sample by acquiring a plurality of data points for quantifier signal intensities and/or qualifier signal intensities, over time; and, in case the sample comprises an internal standard, optionally providing, in an embodiment acquiring, a plurality of data points for internal standard quantifier signal intensities and/or internal standard qualifier signal intensities, over time;

b) determining for at least a fraction of the data points acquired in step a), a ratio type selected from the list consisting of (i) analyte quantifier to analyte qualifier ratios, (ii) internal standard quantifier to internal standard qualifier ratios, (iii) analyte quantifier to internal standard quantifier ratios, and (iv) analyte qualifier to internal standard qualifier ratios;

c) comparing the ratios determined in step b) to a reference; and d) identifying and/or verifying at least one analyte peak in a chromatogram based on comparison step c).

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1A:
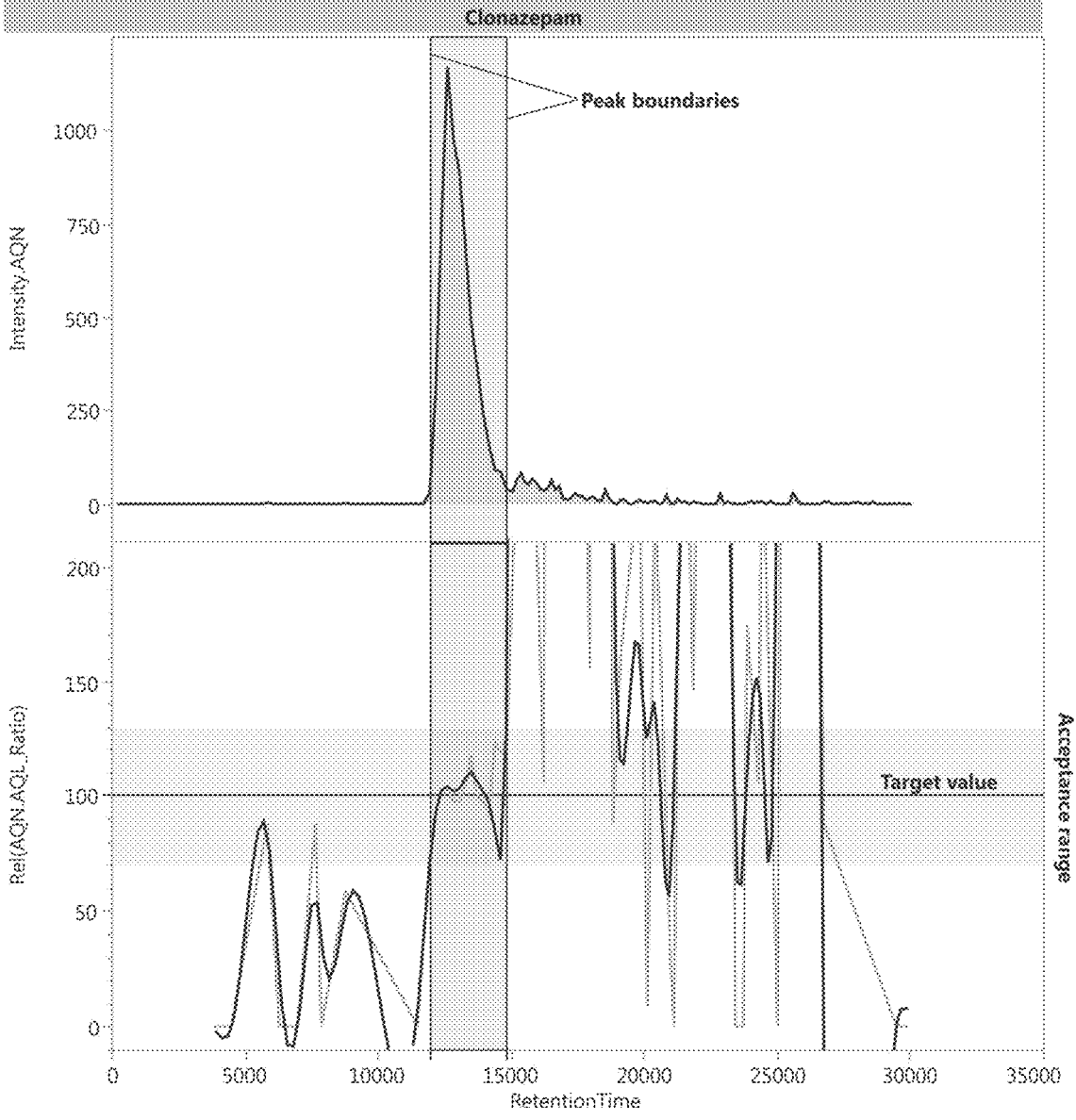
FIGS. 1A and 1B show the chromatograms of clonazepam and EDDP with their quantifier/qualifier ratio blots.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

As the skilled person will understand, internal standard quantifiers and/or internal standard qualifiers, as well as ratios comprising such values, can only be determined in case the sample comprises an internal standard. Thus, the the aforesaid method may be a method for identifying and/or verifying at least one analyte peak in a chromatogram of a sample from a liquid chromatography mass spectrometer device, said method comprising the following steps:

a) providing, in an embodiment determining, a chromatogram of a sample by acquiring a plurality of data points for quantifier and qualifier signal intensities over time;

b) determining analyte quantifier to analyte qualifier ratios for at least a fraction of the data points acquired in step a);

c) comparing the ratios determined in step b) to a reference; and d) identifying and/or verifying at least one analyte peak in a chromatogram based on comparison step c).

Moreover, the aforesaid method may also be a method for identifying and/or verifying at least one analyte peak in a chromatogram of a sample comprising an internal standard for said analyte from a liquid chromatography mass spectrometer device, said method comprising the following steps:

a) providing, in an embodiment determining, a chromatogram of a sample by acquiring a plurality of data points for quantifier signal intensities and/or qualifier signal intensities, over time; and, optionally, providing, in an embodiment acquiring, a plurality of data points for internal standard quantifier signal intensities and/or internal standard qualifier signal intensities, over time;

b) determining for at least a fraction of the data points acquired in step a) a ratio type selected from the list consisting of (i) analyte quantifier to analyte qualifier ratios, (ii) internal standard quantifier to internal standard qualifier ratios, (iii) analyte quantifier to internal standard quantifier ratios, and (iv) analyte qualifier to internal standard qualifier ratios;

c) comparing the ratios determined in step b) to a reference; and d) identifying and/or verifying at least one analyte peak in a chromatogram based on comparison step c).

The terms used herein are broad terms and are to be given their ordinary and customary meaning assigned to them by a person of ordinary skill in the art; thus, the terms used herein are, unless specified otherwise, not to be limited to a special or customized meaning. As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements. Also, as is understood by the skilled person, the expressions "comprising a" and "comprising an" typically refer to "comprising one or more", i.e., are equivalent to "comprising at least one". Likewise, the term "determining an X" refers to determining one X, as well as to determining more than one of X, e.g., two, three, or four of X. Also, the term "plurality" relates to a multitude, in an embodiment at least two, in a further embodiment, in a further embodiment at least three in a further embodiment at least for, in a further embodiment at least five, of the indicated items.

Further, as used in the following, the terms "typically", "more typically", "most typically", "particularly", "more particularly", "specifically", "more specifically" or similar terms are used in conjunction with optional features, without restricting further possibilities. Thus, features introduced by these terms are optional features and are not intended to restrict the scope of the claims in any way. The disclosure may, as the skilled person will recognize, be performed by using alternative features. Similarly, features introduced by "in an embodiment" or similar expressions are intended to be optional features, without any restriction regarding further embodiments of the disclosure, without any restrictions regarding the scope of the disclosure and without any restriction regarding the possibility of combining the features introduced in such way with other optional or non-optional features of the disclosure.

As used herein, the term "about" relates to the indicated value with the commonly accepted technical precision in the relevant field, typically relates to the indicated value ±20%, more typically ±10%, most typically ±5%. Further, the term "essentially" indicates that deviations having influence on the indicated result or use are absent, i.e., potential deviations do not cause the indicated result to deviate by more than ±20%, more typically ±10%, most typically ±5%. Thus, "consisting essentially of" means including the components specified but excluding other components except for materials present as impurities, unavoidable materials present as a result of processes used to provide the components, and components added for a purpose other than achieving the technical effect of the disclosure. For example, a composition defined using the phrase "consisting essentially of" encompasses any known acceptable additive, excipient, diluent, carrier, and the like. Typically, a composition consisting essentially of a set of components will comprise less than 5% by weight, more typically less than 3% by weight, even more typically less than 1%, most typically less than 0.1% by weight of non-specified component(s). As referred to herein, measured and calculated parameters are described on an exemplary basis; as the skilled person understands, the parameters may be modified by standard mathematical operations, in particular by multiplication, division, addition, subtraction, reciprocal forming, scaling, and other operations known to the skilled person; in an embodiment, references are adjusted accordingly, in particular by applying the same mathematical operations. Measured and calculated parameters may also be used in the calculation of a score, which may be calculated on the basis of one or more parameter values, which may optionally be weighted, and/or by further mathematical operations in particular as specified above, e.g., scaling.

The method for identifying and/or verifying at least one analyte peak is an in vitro method. Moreover, it may comprise steps in addition to those explicitly mentioned above. For example, further steps may relate, e.g., to providing a sample for step a), or further calculations in steps b) and/or c). Also, the method may comprise a step a1) determining a putative lower peak boundary and/or a putative upper peak boundary corresponding to the analyte, and optionally determining a putative lower peak boundary and/or a putative upper peak boundary corresponding to the internal standard. Moreover, one or more of said steps may be performed by automated equipment. In an embodiment, in particular steps b) and c) are performed by a processor, in particular by a computer, which may be configured as an evaluation device, as specified elsewhere herein. In an embodiment, the method for identifying and/or verifying at least one analyte peak in a chromatogram of a sample comprising an internal standard further comprises in step a) acquiring a plurality of data points for internal standard quantifier signal intensities and/or internal standard qualifier signal intensities, over time. In an embodiment, the signal intensity or combination thereof to determine (quantifier signal intensity, qualifier signal intensity, internal standard quantifier signal intensity and/or internal standard qualifier signal intensity), if any, is selected independently for each data point. In an embodiment, the signal intensities are determined such that at least one of the ratios indicated in step b) can be determined. In an embodiment, at least quantifier signal intensity and qualifier signal intensity are determined for at least all data points known or suspected to correlate with an elution time of the analyte. In a further embodiment, quantifier signal intensity, qualifier signal intensity, internal standard quantifier signal intensity and internal standard qualifier signal intensity are determined for at least all data points known or suspected to correlate with an elution time of the analyte.

The term "liquid chromatography mass spectrometer device", abbreviated as "LC-MS device", is understood by the skilled person. In an embodiment, the term relates to a device configured for performing a combination of liquid chromatography (LC) with mass spectrometry (MS). Thus, the device, in an embodiment, comprises at least one LC unit, and at least one MS unit, wherein the LC unit and the MS unit are coupled via at least one interface. As used herein, the term "liquid chromatography (LC) unit", in an embodiment, relates to an analytical module configured to separate one or more analytes of interest of a sample from other components of the sample via liquid chromatography, in an embodiment for detection of the one or more analytes with the mass spectrometry device. The LC may be based on any separation principle deemed appropriate by the skilled person; in an embodiment, the LC is reverse phase chromatography, hydrophobic interaction chromatography, ion exchange chromatography, size exclusion chromatography, affinity chromatography, or chiral chromatography; in a further embodiment, the LC is reverse phase chromatography. The LC device may comprise at least one LC column. For example, the LC device may be a single-column LC device or a multi-column LC device having a plurality of LC columns. The LC column may have a stationary phase through which a mobile phase is pumped in order to separate and/or elute and/or transfer the analyte(s) of interest. The LC unit may be or may comprise at least one high-performance liquid chromatography (HPLC) unit and/or at least one micro liquid chromatography (μLC) device. As used herein, the term "mass spectrometry unit", in an embodiment, relates to a mass analyzer configured for detecting at least one analyte based on a mass to charge ratio of the analyte or a fragment thereof. The mass spectrometry unit may be or may comprise at least one quadrupole mass spectrometry device. The interface coupling the LC unit and the MS unit may comprise at least one ionization source configured for generating molecular ions and for transferring the molecular ions into the gas phase. In an embodiment, the MS unit is a tandem mass spectrometry (MS/MS) unit, in a further embodiment, a triple quadrupole MS/MS, in a further embodiment in Multiple Reaction Monitoring (MRM) mode.

The term "chromatogram" is known to the skilled person. In an embodiment, the term relates to a correlation plot of a quantitative measure of one or more signals obtained from a sample by an MS detector with the progress of a chromatographic separation, in an embodiment over time, e.g., retention time and/or elution volume. In an embodiment, said quantitative measure of signal(s) correlates with the concentration of at least part of sample constituents, in particular with the analyte or the internal standard; thus, the quantitative measure of signals may in particular be a signal intensity. Thus, in an embodiment, the chromatogram is an MS chromatogram, in a further embodiment an MS/MS chromatogram. In an embodiment, said quantitative measure of signals comprises an analyte signal intensity and/or an internal standard signal intensity. In an embodiment, the quantitative measure of signals comprises an analyte quantifier, an internal standard quantifier, an analyte qualifier and/or an internal standard qualifier. Thus, in an embodiment, determining at least one chromatogram comprises measuring at least one of an analyte quantifier, an internal standard quantifier, an analyte qualifier and an internal standard qualifier over time and/or elution time, as specified above; in such case, in an embodiment, the MS is tandem MS. As will be understood by the skilled person, the aforesaid representation may be, but does not have to be, a graphical representation; the representation may, however, also be provided e.g., as a list of value pairs, e.g., elution time/quantifier value pairs and/or elution time/qualifier value pairs, or as a mathematical model. As indicated above, the chromatogram may represent more than one signals; in an embodiment, the chromatogram represents two signals, e.g., quantifier signal intensity and qualifier signal intensity; in a further embodiment, the chromatogram represents three signals, in a further embodiment, the chromatogram represents four signals, e.g., quantifier signal intensity and qualifier signal intensity of analyte and internal standard, respectively. As will be understood, the chromatogram may as well represent further signals; the aforesaid multitude of signals may, however, also be represented by a multitude of chromatograms representing one signal each. As the skilled person further understands, elution time may be replaced by any other measure of LC progress deemed appropriate by the skilled person, in particular by elution volume or by retention time. The chromatogram may comprise data points over the whole LC-MS run of a sample; in an embodiment, in particular in case the location of the analyte peak in the chromatogram can be predicted, e.g., from previous runs, the chromatogram may comprise data points over the expected analyte peak breadth, e.g., from the putative lower peak boundary to the putative upper peak boundary, optionally further including data extending 1%, in an embodiment 5%, in a further embodiment 10%, in a further embodiment 50%, in a further embodiment 100% of the respective putative boundary value downstream and/or upstream of the analyte peak.

The term "peak" is known to the skilled person and, in an embodiment, relates to at least one local maximum of a chromatogram. In accordance, the term "analyte peak" relates to a peak correlating with an analyte, in an embodiment for an identified peak of the analyte of interest. Methods for peak integration are known in the art, the term "peak integration", in an embodiment, relating to at least one mathematical operation and/or mathematical algorithm for determining a peak area enclosed by a peak of the chromatogram. Specifically, the integration of the peak may comprise identification and/or measurement of curve characteristics of the chromatogram. The peak integration may comprise one or more of peak detection, peak finding, peak identification, peak fitting, peak evaluation, determining a lower peak boundary and/or an upper peak boundary, determining of background, and determining of basis line. The peak integration may allow determining of one or more of peak area, retention time, peak height, and peak width. In an embodiment, peak detection and/or integration are performed automatically, i.e., without manual action or interaction with a user. In particular, peak identification and/or peak detection and/or determining of peak area may be performed non-manually and without manual action or interaction with a user.

The term "identifying an analyte peak", as used herein, relates to any measure determining at least one parameter of a peak in a chromatogram. In an embodiment, said identifying comprises identifying a lower peak boundary and/or an upper peak boundary, identifying peak identity and/or peak purity, and/or identifying an analyte peak area to internal standard peak area ratio (peak area ratio).

The term "verifying an analyte peak", as used herein, includes any measure(s) confirming a pre-established measurement of an analyte via a chromatogram; thus, in an embodiment, said verifying is verifying a putative lower peak boundary and/or a putative upper peak boundary of a peak, verifying peak identity and/or peak purity, and/or verifying an analyte peak area to internal standard peak area ratio (peak area ratio).

The term "putative peak boundary", as used herein, relates to a peak boundary not verified by a method as specified herein. Thus, the putative peak boundary, in an embodiment, is a preliminary peak boundary and may be determined based on the chromatogram as specified elsewhere herein by conventional methods, e.g., of peak detection and/or peak integration; the putative peak boundary may also be a peak boundary determined based on a different chromatogram, e.g., an LC-UV/VIS-chromatogram; also, the putative peak boundary may be a pre-determined peak boundary determined e.g., based on preceding LC-MS runs with the same or a similar sample, or with essentially pure analyte and/or internal standard. In an embodiment, the putative peak boundary may also be a predicted peak boundary, e.g., predicted based on preceding runs with a compound chemically similar to the analyte. In accordance, the putative peak boundary may be identified by a specific value or by a range, in a further embodiment is identified by a specific value, e.g., a value of a retention time or elution volume.

In accordance with the above, the term "putative analyte peak area to internal standard peak area ratio", also referred to as "putative peak area ratio" relates to an analyte peak area to internal standard peak area ratio not verified by a method as specified herein; thus, the putative peak area ratio, in an embodiment, is a preliminary peak area ratio and may be determined based on the chromatogram as specified elsewhere herein by conventional methods. As the skilled person understands, the peak area ratio as specified above is commonly used for quantifying an analyte in LC-MS methods, in particular using a calibration curve.

As used herein, the term "sample", also referred to as "test sample", relates to any type of composition of matter; thus, the term may refer, without limitation, to any arbitrary sample such as a biological sample. In an embodiment, the sample is a liquid sample, in a further embodiment an aqueous sample. In an embodiment, the test sample is selected from the group consisting of: a physiological fluid, including blood, serum, plasma, saliva, ocular lens fluid, lacrimal fluid, cerebrospinal fluid, sweat, urine, milk, ascites, mucus, synovial fluid, peritoneal fluid, and amniotic fluid; lavage fluid; tissue, cells, or the like. In an embodiment, the sample is a blood, plasma, serum, saliva, or urine sample, in a further embodiment a blood, plasma, or serum sample, in a further embodiment a serum or plasma sample. The sample may, however, also be a natural or industrial liquid, in particular surface or ground water, sewage, industrial wastewater, processing fluid, soil eluates, and the like. In an embodiment, the sample comprises or is suspected to comprise at least one chemical compound of interest, i.e., a chemical which shall be determined, which is referred to as "analyte". The sample may comprise one or more further chemical compounds, which are not to be determined and which are commonly referred to as "matrix". The sample may be used directly as obtained from the respective source or may be subjected to one or more pretreatment and/or a sample preparation step(s). Thus, the sample may be pretreated by physical and/or chemical methods, in an embodiment by centrifugation, filtration, mixing, homogenization, chromatography, precipitation, dilution, concentration, contacting with a binding and/or detection reagent, and/or any other method deemed appropriate by the killed person. In, i.e., before, during, and/or after, the sample preparation step, one or more internal standard(s) may be added to the sample. The sample may be spiked with the internal standard. For example, an internal standard may be added to the sample at a predefined concentration. The internal standard may be selected such that it is easily identifiable under normal operating conditions of a mass spectrometry device. The concentration of the internal standard may be pre-determined and significantly higher than the concentration of the analyte.

As indicated above, the term "analyte", as used herein, relates to any chemical compound or group of compounds which shall be determined in a sample. In an embodiment, the analyte is a macromolecule, i.e., a compound with a molecular mass of more than 1000 u (i.e., more than 1 kDa). In a further embodiment, the analyte is a biological macromolecule, in particular a polypeptide, a polynucleotide, a polysaccharide, or a fragment of any of the aforesaid. In an embodiment, the analyte is a small molecule chemical compound, i.e., a compound with a molecular mass of at most 1000 u (1 kDa). In a further embodiment, the analyte is a chemical compound metabolized by a body of a subject, in particular of a human subject, or is a compound administered to a subject in order to induce a change in the subject's metabolism. Thus, in an embodiment, the analyte is a drug of abuse or a metabolite thereof, e.g., amphetamine; cocaine; methadone; ethyl glucuronide; ethyl sulfate; an opiate, in particular buprenorphine, 6-monoacetylmorphine, codeine, dihydrocodeine, morphine, morphine-3-glucuronide, and/or tramadol; and/or an opioid, in particular acetylfentanyl, carfentanil, fentanyl, hydrocodone, norfentanyl, oxycodone, and/or oxymorphone.

In an embodiment, the analyte is a therapeutic drug, e.g., valproic acid; clonazepam; methotrexate; voriconazole; mycophenolic acid (total); mycophenolic acid-glucuronide; acetaminophen; salicylic acid; theophylline; digoxin; an immuno suppressant drug, in particular cyclosporine, everolimus, sirolimus, and/or tacrolimus; an analgesic, in particular meperidine, normeperidine, tramadol, and/or O-desmethyl-tramadol; an antibiotic, in particular gentamycin, tobramycin, amikacin, vancomycin, piperacilline (tazobactam), meropenem, and/or linezolid; an antiepileptic, in particular phenytoin, valproic acid, free phenytoin, free valproic acid, levetiracetam, carbamazepine, carbamazepine-10,11-epoxide, phenobarbital, primidone, gabapentin, zonisamid, lamotrigine, and/or topiramate. In an embodiment, the analyte is a hormone, in particular cortisol, estradiol, progesterone, testosterone, 17-hydroxyprogesterone, aldosterone, dehydroepiandrosteron (DHEA), dehydroepiandrosterone sulfate (DHEA-S), dihydrotestosterone, and/or cortisone; in an embodiment, the sample is a serum or plasma sample and the analyte is cortisol, DHEA-S, estradiol, progesterone, testosterone, 17-hydroxyprogesterone, aldosterone, DHEA, dihydrotestosterone, and/or cortisone; in an embodiment, the sample is a saliva sample and the analyte is cortisol, estradiol, progesterone, testosterone, 17-hydroxyprogesterone, androstendione, and/or cortisone; in an embodiment, the sample is a urine sample and the analyte is cortisol, aldosterone, and/or cortisone. In an embodiment, the analyte is a vitamin, in an embodiment vitamin D, in particular ergocalciferol (Vitamin D2) and/or cholecalciferol (Vitamin D3) or a derivative thereof, e.g., 25-hydroxy-vitamine-D2, 25-hydroxy-vitamine-D3, 24,25-dihydroxy-vitamine-D2, 24,25-dihydroxy-vitamine-D3, 1,25-dihydroxy-vitamine-D2, and/or 1,25-dihydroxy-vitamine-D3. In a further embodiment, the analyte is a metabolite of a subject.

As used herein, the term "internal standard", in an embodiment, relates to an analyte which is present with a defined concentration in a sample. Thus, in an embodiment, the concentration of the internal standard is known; it is, however, also envisaged that the concentration of the standard is unknown, but is the same for at least the sample of interest and at least one calibration sample; in such case, in an embodiment, the concentration of the internal standard is the same for all samples analyzed. The internal standard, in an embodiment, is structurally similar to the analyte, in a further embodiment is structurally identical to the analyte. In particular in the latter case, in an embodiment, the internal standard is an isotope-labelled molecule, in particular an isotope-labelled version of the analyte, e.g., a $^2$H (deuterated), $^{15}$N, and/or $^{13}$C-labelled derivative. The internal standard sample may be a sample comprising at least one internal standard substance with a pre-defined amount. For further details with respect to the standard sample, reference is made e.g., to EP 3 425 369 A1.

The term "providing", as used herein, relates to making available the indicated information or object. Thus, in case of providing a chromatogram, the chromatogram may be provided as data, e.g., as a graphical representation, as a list of measurement values, e.g., as value pairs such as elution time/quantifier value pairs and/or elution time/qualifier value pairs, or as a mathematical model. The chromatogram may be provided via any medium deemed appropriate by the skilled person, in particular via an operative connection between an MS device and an evaluation device, via a data connection such as a data network, or via a data storage medium. In an embodiment, providing is determining as specified herein below.

The term "determining" is understood by the skilled person as referring to settling on, concluding on, or ascertaining a fact and/or data. Thus, in an embodiment, determining relates to a quantitative determination. Also, "determining a chromatogram" relates to measuring parameter values as specified elsewhere herein for a chromatogram, specifically recording, and optionally storing on a suitable storage device, data points representing a signal of an LC-MS device recorded over the progress of an LC-MS run. Similarly, "determining a ratio", in an embodiment, is establishing the value of a ratio as specified elsewhere herein. As will be understood by the skilled person, typically, ratios are calculated from values measured at the same time of chromatography progress, e.g., having the same elution time or elution volume.

The terms "quantifier" and "qualifier", in the context of the present description, are understood by the skilled person. In an embodiment, the terms relate to signals of fragments of an analyte generated in tandem MS, wherein generally the most abundant and/or most reliably detected fragment is used for quantifying the analyte (analyte quantifier), whereas a second fragment is used for confirmation of identity of the analyte (analyte qualifier). Corresponding terms are frequently abbreviated as AQN (analyte quantifier) and AQL (analyte qualifier). In an embodiment, the values, in particular if used for the calculation of quantifier/qualifier ratios, are single-cycle values, i.e., intensities determined in one scan cycle, selected ion monitoring (SIM) cycle, or multiple reaction monitoring (MRM) cycle. In a further embodiment, the values, in particular if used for the calculation of quantifier/qualifier ratios, are derived from single-cycle intensity values by standard mathematical calculations, including in particular normalization, standardization, calculation of an average or a median over several single-cycle values, data smoothing over several single-cycle values, and the like. Thus, in an embodiment, each value used as a quantifier or qualifier value is derived from at most ten, in an embodiment at most five, in a further embodiment at most two single-cycle intensity values, in an embodiment consecutive single-cycle intensity values. The values of the two parameters are usually determined as signal intensity of ions having the corresponding m/z value and may be correlated with LC progress to result in the chromatogram of the present description; in accordance, the value of the AQN or AQL may be determined as single-cycle value or by known methods of peak integration. The expression "determining a quantifier to qualifier ratio" relates to calculating the ratio by dividing the value of the qualifier by the value of the quantifier. In an embodiment, the AQN/AQL ratio is a compound-specific and measurement method-specific parameter of an analyte. As will be understood, the above applies to measurement of internal standard quantifiers and qualifiers mutatis mutandis.

The term "fraction of the data points", as used herein, relates to a subportion of the data points determined. As will be understood from the disclosure herein, the fraction of data points recorded and/or selected may depend on the parameter to be identified or verified. Thus, in case a putative (upper or lower) peak boundary shall be identified or verified, the fraction of the data points, in an embodiment, includes data points upstream and/or downstream of the putative peak boundary. Thus, in an embodiment, the fraction of the data points may comprise 50, in a further embodiment 25, in a further embodiment ten, in a further embodiment five data points embracing the putative peak boundary, in an embodiment symmetrically embracing the putative peak boundary. Correspondingly, in case a peak identity, a peak purity, and/or a peak area ratio shall be identified and/or verified, the fraction of the data points, in an embodiment, includes data points suitably dispersed, in an embodiment regularly dispersed, over peak breadth, e.g., data points 1-3, 7-9, 13-15 etc., or data points evenly dispersed over peak breadth, e.g., every second or every third data point; in such case, in an embodiment, data points corresponding to at least $\frac{1}{4}^{th}$, in a further embodiment at least $\frac{1}{3}^{rd}$, in a further embodiment at least half of the data points corresponding to peak breadth are analyzed; in a further embodiment, contiguous data points are analyzed; in such case, in an embodiment, data points corresponding to at least 50%, in a further embodiment at least 75%, in a further embodiment at least 90%, in a further embodiment at least 95%, in a further embodiment at least 99% of peak breadth are analyzed; in a further embodiment, all data points of a peak are analyzed.

The term "reference", as used herein, refers to a discriminator which allows identification of the relevant parameter and/or its verification. Such a discriminator may be a target value of a ratio, e.g., of an AQN/AQL ratio indicative of an essentially pure analyte. In an embodiment, the reference is a quantitative indicator, in a further embodiment is a value, e.g., a threshold value, is a range, e.g., a range of values, is a score, or is any other value or range deemed appropriate by the skilled person. In an embodiment, depending on the type of reference selected, the reference is an analyte specific, device specific, and/or method specific parameter, in a further embodiment is an analyte specific parameter. Methods for establishing appropriate references are provided elsewhere herein on an exemplary basis. In an embodiment, in case a quantifier/qualifier ratio of an analyte is analyzed, the reference is a value of a quantifier/qualifier ratio determined for an essentially pure analyte; correspondingly, in an embodiment, in case a quantifier/qualifier ratio of an internal standard is analyzed, the reference is a value of a quantifier/qualifier ratio determined for an essentially pure internal standard. In a further embodiment, in case a quantifier/qualifier ratio of an analyte is analyzed, the reference is a range derived from a quantifier/qualifier ratio determined for an essentially pure analyte, e.g., the quantifier/qualifier ratio determined for an essentially pure analyte ±100%, in an embodiment ±50%, in a further embodiment ±30%; correspondingly, in an embodiment, in case a quantifier/qualifier ratio of an internal standard is analyzed, the reference is a range derived from a quantifier/qualifier ratio determined for an essentially pure internal standard, e.g., the quantifier/qualifier ratio determined for an essentially pure internal standard ±100%, in an embodiment ±50%, in a further embodiment ±25%, in a further embodiment ±10%. The above applies to other ratios, e.g., an analyte quantifier to internal standard quantifier ratio mutatis mutandis.

In an embodiment, identifying and/or verifying at least one analyte peak comprises identifying and/or verifying at least one putative peak boundary of an analyte peak. In such case, in an embodiment, in particular data points embracing the putative peak boundary are analyzed. In a further embodiment, it may be sufficient to analyze only data points close to the putative peak boundary and within the analyte peak. In an embodiment, an analyte peak is identified and/or verified in case the ratio determined meets a pre-defined acceptance criterion based on a reference, in particular lies within a pre-defined reference range, in a further embodiment in case the ratio lies within a pre-defined reference range for a pre-defined fraction of data points, e.g., at least 3 out of 5 data points. In an embodiment, the peak boundary is identified and/or verified in case the average of said ratio over a multitude of n data points meets a pre-defined acceptance criterion, in an embodiment with n being at least two, in a further embodiment being at least three, in a further embodiment being at least four, in a further embodiment being at least five, in a further embodiment being at least seven, in a further embodiment being at least ten, data points. The expression "average" of values, as used herein, relates to any parameter indicative of an average deemed appropriate by the skilled person, in particular a median or a mean.

In an embodiment, identifying and/or verifying at least one analyte peak comprises identifying and/or verifying peak identity and/or peak purity. In such case, in an embodiment, the fraction of the data points for which ratios are determined in step b) comprises data points between the putative lower peak boundary and the putative upper peak boundary. In an embodiment, peak identity and/or peak purity is verified in case the ratio determined meets a pre-defined acceptance criterion based on a reference, in particular lies within a pre-defined reference range. In a further embodiment, peak identity is verified in case an average of said ratio over a multitude of n data points lies within a pre-defined reference range, in an embodiment with n being at least two, in a further embodiment being at least three, in a further embodiment being at least four, in a further embodiment being at least five, in a further embodiment being at least seven, in a further embodiment being at least ten, data points. In a further embodiment, peak purity is verified in case the ratio lies within a pre-defined reference range for a pre-defined fraction of data points, in an embodiment at least 80% of data points analyzed between the putative lower peak boundary and/or a putative upper peak boundary, in an embodiment at least 90% of data points analyzed between the putative lower peak boundary and/or a putative upper peak boundary, in an embodiment at least 95% of data points analyzed between the putative lower peak boundary and/or a putative upper peak boundary, in an embodiment at least 80% of data points between the putative lower peak boundary and/or a putative upper peak boundary, in an embodiment at least 90% of data points between the putative lower peak boundary and/or a putative upper peak boundary, in an embodiment at least 95% of data points between the putative lower peak boundary and/or a putative upper peak boundary.

In an embodiment, identifying and/or verifying at least one analyte peak comprises identifying and/or verifying a putative peak area ratio. In an embodiment, in such case, the method further comprises determining a putative peak area ratio based on the putative peak boundaries identified in step a1) and further comprises determining analyte quantifier to internal standard quantifier ratios, or analyte qualifier to internal standard qualifier ratios. In such case, in an embodiment, the fraction of the data points for which ratios are determined in step b) comprises data points between the putative lower peak boundary and the putative upper peak boundary, in an embodiment a fraction as specified herein above. Further, in such case, the putative peak area ratio is verified in case an average of said ratio calculated over at least 10% of data points between the putative lower peak boundary and/or a putative upper peak boundary, in an embodiment at least 50% of data points between the putative lower peak boundary and/or a putative upper peak boundary, in an embodiment at least 90% of data points between the putative lower peak boundary and/or a putative upper peak boundary, is within a range defined by said peak area ratio ±X, X being 100% of the peak area ratio, in an embodiment 50%, in a further embodiment 30%.

In an embodiment, the method is a method of verifying at least one putative peak boundary of an analyte peak, peak purity, and/or a putative peak area ratio. In an embodiment, in such case, said method comprises determining analyte quantifier to internal standard quantifier ratios, analyte qualifier to internal standard qualifier ratios, analyte quantifier to analyte qualifier ratios, internal standard quantifier to internal standard qualifier ratios, analyte quantifier to internal standard qualifier ratios and internal standard quantifier to analyte qualifier ratios, and further comprises determining the distribution of said ratios. As used herein, the term "distribution" value relates to any parameter indicative of a statistical dispersion of values deemed appropriate by the skilled person. In an embodiment, the distribution is a representation of frequencies of specific ratio values, which may e.g., be represented graphically as a plot of ratio values versus their frequency. In an embodiment, the distribution value is a skewness or kurtosis. In an embodiment, in such case, the reference is a value or range of said distribution pre-determined on a sample comprising at least partially pure analyte, in an embodiment, a sample for which it was determined that the analyte is separated from potential interferences, in a further embodiment, a sample comprising essentially pure analyte. In a further embodiment, the sample is a sample for which a mean peak resolution to the closest interference of at least about 0.7, in an embodiment at least about 0.8, in a further embodiment at least about 0.9 was determined. In a further embodiment, at least one putative peak boundary of an analyte peak, a peak purity, and/or a putative peak area ratio is verified in case the distribution value corresponds to a reference value or reference range. In an embodiment, the reference range is the distribution value ±100%, in an embodiment ±75%, in a further embodiment ±50% of the distribution value determined for the at least partially pure analyte.

As will be understood by the skilled person in the light of the instant description, the method for identifying and/or verifying at least one analyte peak may comprise identifying and/or verifying at least one putative peak boundary of an analyte peak, a peak identity, a peak purity, and/or a peak area ratio; thus, the method may comprise one or more of the aforesaid identifications and/or verifications; also, the method may comprise one or more identification(s) combined with one or more verification(s), e.g., identification of at least one peak boundary may be combined with verification of a peak area ratio. It will also be understood that e.g., analyzing data points lying within putative peak boundaries may be used to identify and/or verify the lower and upper putative peak boundary of an analyte peak, peak identity, peak purity, and peak area ratio. In an embodiment, such analysis is performed in a hierarchical manner e.g., by first identifying and/or verifying at least one putative peak boundary, and only proceeding to identifying and/or verifying peak identity, peak purity, and/or peak area ratio in case the at least one putative peak boundary can be identified/verified; and/or first identifying and/or verifying at least one putative peak boundary of an analyte peak, a peak identity, and/or a peak purity, and only proceeding to identifying and/or verifying peak area ratio in case the at least one putative peak boundary, peak identity, and/or peak purity can be identified/verified.

Advantageously, it was found in the work underlying the present disclosure that single-cycle mass transitions parameters can be used for identifying and/or verifying critical parameters of analytical LC-MS, in particular peak boundaries, peak identity, peak purity, but also peak area ratio. Advantageously, data points used therefor can be retrieved from raw LC-MS data of the initial analytic run and do not require additional tests or reagents.

The definitions made above apply mutatis mutandis to the following. Additional definitions and explanations made further below also apply for all embodiments described in this specification mutatis mutandis.

The present disclosure also relates to a method of quality control of a liquid chromatography mass spectrometry (LC-MS) measurement of an analyte in a sample, comprising the steps A) measuring said analyte in the sample using the liquid chromatography mass spectrometer device and determining at least one chromatogram;

B) performing steps b) to d) of the method for identifying and/or verifying at least one analyte peak of the present disclosure, and C) evaluating quality of said LC-MS measurement based on the results of step B).

The method of quality control is an in vitro method. Moreover, it may comprise steps in addition to those explicitly mentioned above. For example, further steps may relate, e.g., to providing a sample for step a), or further calculations in steps b) and/or c). Also, the method may comprise a further step in case at least one of a putative peak boundary, a peak identity, a peak purity, and a peak area ratio is not verified in step B), being a step of one or more of: i) marking the result of step A) as unreliable; ii) not outputting the result of step A), and (iii) initiating a re-run of said sample, optionally using a non-identical LC-MS protocol. The method may be assisted or performed by automated equipment, e.g., an evaluation unit as specified herein below.

The term "quality control", as used herein, is known to the skilled person. In an embodiment, quality control is the process of ensuring that processes performed and/or goods produced by an entity are in conformity with pre-defined quality criteria. In a further embodiment, quality control in sample measurement, in particular in measurement of medical samples such as patient samples, e.g., in clinical diagnostics and/or clinical chemistry, comprises ensuring that the analysis results obtained with a specific measuring method correspond to the results obtainable with a gold standard method and, therefore, in an embodiment correspond to the results theoretically obtainable, within a prespecified range. Thus, in an embodiment, the method for quality control comprises as further step evaluating quality of said LC-MS measurement based on the results of step B), and optionally taking appropriate measures, in an embodiment as specified herein above.

The term "measuring an analyte in a sample" is understood by the skilled person. In an embodiment, the term relates to a qualitative, semi-quantitative, or quantitative determination of the amount of analyte in a sample, in an embodiment to a quantitative determination of the amount of analyte in a sample. As used herein, the term "amount" of an analyte relates to any quantitative measure of the analyte, and is equivalent to other corresponding measures such as mass fraction and concentration, which can be calculated from the amount in case sample mass or sample volume is known. Thus, the result of measurement of an analyte in a sample may be expressed in any unit deemed appropriate by the skilled person, including arbitrary units, measures of weight, of mass fraction, of concentration, and the like, or measures derived therefrom, e.g., international units according to a pre-defined definition.

Methods for determining the amount of an analyte by LC-MS are, in principle, known to the skilled person. In an embodiment, the method comprises quantitatively determining an amount of an analyte in a sample by determining a peak area of the analyte (analyte peak area); in a further embodiment, further a peak area of an internal standard is determined (IS peak area) and a ratio of the analyte peak area and the IS peak area is determined and, in an embodiment, said ratio is compared to a calibration function, whereby a concentration value is determined. Corresponding methods are known to the skilled person.

The present disclosure further relates to a system for determining a concentration of at least one analyte in a sample comprising:

(I) at least one liquid chromatography mass spectrometer device, wherein the liquid chromatography mass spectrometer device is configured for measuring the analyte in the sample and for acquiring data points over time, in an embodiment for performing step a) of the method for identifying and/or verifying at least one analyte peak of the present disclosure; and (II) at least one evaluation device, wherein the evaluation device is configured for performing at least steps b), c) and/or d), in an embodiment all steps b) to d) of the method for identifying and/or verifying at least one analyte peak of the present disclosure.

The term "system", as used herein, relates to different means which are operatively linked to each other. Said means may be implemented in a single physical unit or may be physically separated units which are operatively linked to each other. Suitable components and their properties are described elsewhere herein below and also herein above in the context of the method for identifying and/or verifying at least one analyte peak. Consequently, the methods of the present disclosure can be implemented by the system specified herein. Thus, in an embodiment, the device is configured to perform the method for identifying and/or verifying at least one analyte peak as specified elsewhere herein, and/or the method of quality control as specified elsewhere herein. The system may comprise further devices or units, in particular a data collector, an output unit, a communication interface, and/or any other device or unit deemed appropriate by the skilled person.

The LC-MS device and means and methods for determining at least one chromatogram have been described herein above in the context of the method for identifying and/or verifying at least one analyte peak of the present disclosure.

The term "evaluation device" generally refers to an arbitrary device adapted to perform the method step(s) as described above, in an embodiment by using at least one data processing device and, in a further embodiment, by using at least one processor and/or at least one application-specific integrated circuit. Thus, as an example, the at least one evaluation device may comprise at least one data processing unit having a software code stored thereon comprising a number of computer commands. The evaluation device may provide one or more hardware elements for performing one or more of the indicated operations and/or may provide one or more processors with software running thereon for performing one or more of the method steps.

As used herein, the term "data collector" relates to any arbitrary storage unit configured for storing data, in particular data points determined by the LC-MS device, chromatograms, ratios determined, results of identification and/or verifications, and/or recommendations provided and/or decisions taken on further proceeding with regards to the sample. In an embodiment, the data collector comprises at least one database configured for receiving and/or storing at least one chromatogram. In an embodiment, the data collector comprises at least one database comprising one or more reference values.

The term "output unit", as used herein, relates to any arbitrary unit configured for a transfer of information from the system to another entity, wherein another entity may be a further data processing device and/or a user. Thus, the output device may comprise a user interface, such as an appropriately configured display, or may be a printer. The output unit may, however also be an indicator, e.g., an indicator lamp, indicating e.g., detection of carry over.

The term "communication interface" is understood by the skilled person to relate to any arbitrary interface configured for exchange of information, in particular exchange of data. Such data exchange may be achieved by a permanent or temporary physical connection, such as coaxial, fiber, fiber-optic or twisted-pair, 10 BASE-T cables, storage unit connectors, such as USB, firewire, and similar connectors. Alternatively, it may be achieved by a temporary or permanent wireless connection using, e.g., radio waves, such as Wi-Fi, LTE, LTE-advanced or Bluetooth.

The disclosure further discloses and proposes a computer program including computer-executable instructions for performing a method according to the present disclosure in one or more of the embodiments enclosed herein when the program is executed on a computer or computer network. Specifically, the computer program may be stored on a computer-readable data carrier. Thus, specifically, one, more than one or even all method steps as indicated above may be assisted or performed by using a computer or a computer network, typically by using a computer program.

The disclosure further discloses and proposes a computer program product having program code means, in order to perform the method according to the present disclosure in one or more of the embodiments enclosed herein when the program is executed on a computer or computer network.

Specifically, the program code means may be stored on a computer-readable data carrier.

Further, the disclosure discloses and proposes a data carrier having a data structure stored thereon, which, after loading into a computer or computer network, such as into a working memory or main memory of the computer or computer network, may execute the method according to one or more of the embodiments disclosed herein.

The disclosure further proposes and discloses a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Further, the disclosure proposes and discloses a modulated data signal which contains instructions readable by a computer system or computer network, for performing the method according to one or more of the embodiments disclosed herein.

In an embodiment, referring to the computer-implemented aspects of the disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, the present disclosure further discloses:

A computer or computer network comprising at least one processor, wherein the processor is adapted to perform the method according to one of the embodiments described in this description, a computer loadable data structure that is adapted to perform the method according to one of the embodiments described in this description while the data structure is being executed on a computer, a computer program, wherein the computer program is adapted to perform the method according to one of the embodiments described in this description while the program is being executed on a computer, a computer program comprising program means for performing the method according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, and a computer program product having program code means, wherein the program code means can be stored or are stored on a storage medium, for performing the method according to one of the embodiments described in this description, if the program code means are executed on a computer or on a computer network.

The present disclosure further relates to a method for optimizing an analysis method for an analyte on an LC-MS device, comprising the steps of a) providing, in an embodiment determining, a chromatogram of a sample by acquiring a plurality of data points for quantifier signal intensities and qualifier signal intensities, over time;

b) determining a putative lower peak boundary, a putative upper peak boundary, a putative peak maximum, a peak identity, and/or a peak purity;

c) verifying the putative lower peak boundary, the putative upper peak boundary, the putative peak maximum, the peak identity, and/or the peak purity of step (b) by the method for identifying and/or verifying at least one analyte peak of the present disclosure;

d) modifying a sample pretreatment parameter, an LC parameter, and/or an MS parameter in case at least one of the putative lower peak boundary, the putative upper peak boundary, the putative peak maximum, the peak identity, and/or the peak purity is not verified in step (c); and e) thereby optimizing the analysis method for the analyte.

The method for optimizing an analysis method is an in vitro method. The method may comprise steps in addition to those specified above; e.g., further steps may relate to providing a sample for analysis. In the method for optimizing an analysis method, the sample may comprise a partially or essentially pure analyte; in an embodiment, however, the sample is a sample of a body fluid or from body cells, in an embodiment is a sample of a body fluid. The method may be assisted by automated equipment. In an embodiment, the method is a fully automated method.

The term "optimizing an analysis method" is, in principle, understood by the skilled person. In an embodiment, the term relates to a proceeding comprising modifying parameters of an analytical LC-MS method such that an analyte of interest can be measured essentially interference-free, in an embodiment in the presence of matrix components, in a further embodiment in the presence of the matrix components expected to be present in a sample. Thus, in an embodiment, the method steps a) to e) are repeated until in step d), the putative lower peak boundary, the putative upper peak boundary, the putative peak maximum, the peak identity, and/or the peak purity is verified.

The term "sample pretreatment parameter" is understood by the skilled person to relate to any pretreatment parameter known or assumed to have an impact on the result of an analytical LC-MS run on said sample. In an embodiment, the parameter pertains to sample pretreatment after reception in the analysis laboratory. Thus, in an embodiment, the sample pretreatment parameter is a parameter of sample handling, e.g., temperature, a parameter of physical sample pretreatment, e.g., centrifugation, filtration, heating and/or cooling, a parameter of chemical sample pretreatment, e.g., sample precipitation and/or extraction and solvent(s) used therefor, derivatization of sample constituents, and the like.

The term "LC parameter" is understood by the skilled person to relate to any LC parameter known or assumed to have an impact on the result of an analytical LC-MS run on a sample. In an embodiment, said LC parameter is selected from sample dilution, sample volume, selection of separation principle and of LC column, selection of solvent or solvents, form of gradient, column temperature, and the like.

The term "MS parameter" is understood by the skilled person to relate to any MS parameter known or assumed to have an impact on the result of an analytical LC-MS run on a sample. In an embodiment, said MS parameter is selected from ionization method, detector type, number of fragmentations, and the like.

The term "modifying a parameter", as used herein, relates to any change in a parameter known or assumed to have an impact on the result of an analytical LC-MS run. Thus, the modification typically is to such an extent that a change of result is expected. In an embodiment, the parameter modified is an LC parameter. In an embodiment, the parameter is modified by an operator of the LC-MS device, in a further embodiment, the parameter is modified automatically, in particular in accordance with an optimization algorithm. Appropriate algorithms are known in the art. Thus, in an embodiment, the method for optimizing an analysis method is implemented on a system as specified herein above; as the skilled person understands, the system may comprise a multitude of LC-MS devices in such case, operably connected to at least one evaluation device as specified.

The present disclosure also relates to a method for purifying a compound of interest from a preparative sample on an LC device, comprising a) separating constituents of said preparative sample by said LC device into fractions and preliminarily allocating one or more fractions for pooling;

b) recording an MS chromatogram of an aliquot of at least one of the fractions preliminarily allocated for pooling in step a);

c) verifying allocation of said at least one fraction of step b) for pooling by the method according to the method for identifying and/or verifying at least one analyte peak;

d) including samples with a verified allocation in the pooling of the fractions comprising the compound; and e) thereby purifying said compound of interest.

The method for purifying a compound is an in vitro method, in an embodiment is a preparative method. Moreover, the method may comprise further steps in addition to those specified above. E.g., further steps may relate to sample pre-treatment and/or sample pre-purification. Thus, in an embodiment, the sample is a pre-purified sample. Also, a chromatogram of the LC separation may be recorded, e.g., an UV/VIS chromatogram. In an embodiment, the method is the last LC step in a preparative purification of a compound.

The term "compound of interest", as used herein, includes any chemical molecule deemed to be of interest of being purified or further purified by the skilled person. In an embodiment, the compound of interest is a compound from one of the groups indicated above as analytes, or is one of the compounds indicated herein above as analyte. Thus, in an embodiment, the compound of interest is a low-molecular mass compound, having a molecular mass of at most 1 kDa. In a further embodiment, the compound of interest is a macromolecule, in an embodiment a biological macromolecule, in an embodiment with a molecular mass of more than 1 kDa. In an embodiment, the compound of interest is a polypeptide, in a further embodiment a therapeutic polypeptide.

The term "preparative sample" as used herein, relates to a sample comprising a compound of interest in an amount sufficient for preparative purification. As the skilled person understands, an amount sufficient for preparative purification strongly depends on the type of compound of interest comprised; in an embodiment, the preparative sample comprises the compound of interest in an amount of at least 1 mg, in an embodiment at least 10 mg, in a further embodiment at least 100 mg, in a further embodiment at least 1 g, in a further embodiment at least 10 g, in a further embodiment at least 100 g, in a further embodiment at least 1 kg. As indicated above, the preparative sample, in an embodiment, is a pre-purified sample; thus in an embodiment, the compound of interest is comprised in the preparative sample at a purity of at least 10%, in a further embodiment at least 25%, in a further embodiment at least 50%, in a further embodiment at least 75%, in a further embodiment at least 85%, in a further embodiment at least 90%, in a further embodiment at least 95%, in a further embodiment at least 99%. As the skilled person understands, the volume of the preparative sample strongly depends on the type of compound of interest, its concentration, and the LC to be performed; thus, the volume of the preparative sample may be of from a few microliters to several thousand liters. Typically, the preparative sample is devoid of internal standard.

The term "fraction" is understood by the skilled person to relate to a subportion of a composition of matter, in an embodiment a subportion of the eluate of an LC separation as specified herein, resulting from the application of a separation step to a preparative sample. In an embodiment, at least one of the fractions is known or suspected to comprise the compound of interest. In particular in case a low number of fractions is obtained, in particular three or two fractions, the fractions need not necessarily have the same volumes. In an embodiment, the fraction as specified herein is a virtual fraction, i.e., generated by formally dividing an eluate of a separation step into subportions, which may have the same or different volumes. In a further embodiment, the fractions are physical fractions, which may have the same or different volumes, comprised in separate containers. In an embodiment, at least part of the fractions are fractions known or suspected, e.g., from previous instances of performing the method, to comprise the compound of interest.

As used herein, the term "aliquot of a fraction" relates to a subportion of a fraction, typically a small subportion compared to the volume of the fraction, e.g., a tenth, a hundredth, a thousandth, or even less of the volume of the fraction.

The term "at least one of the fractions" is understood by the skilled person to relate to a number of at least one fraction of all fractions provided. In an embodiment, at least one of the fractions is at least two, in an embodiment at least 5, in a further embodiment at least 10 fractions. In a further embodiment, at least one of the fractions relates to at least 1%, in an embodiment at least 5%, in a further embodiment at least 10%, in a further embodiment at least 25%, in a further embodiment at least 50% of all fractions provided. In an embodiment, at least part of the fractions includes all fractions provided. As indicated above, in an embodiment, at least part of the fractions is known or suspected, e.g., from previous instances of performing the method, to comprise the compound of interest; also, it may be known that purity is only critical for a part of the fractions, e.g., those close to the start and/or the end of a product peak in an LC chromatogram. Thus, in the method for purifying a compound of interest an MS chromatogram may be sufficient to be recorded only for those fractions for which purity of the compound of interest needs to be established, i.e., for which allocation to pooling needs to be verified as specified herein below. Thus, in an embodiment, the method for purifying a compound of interest may comprise identifying and/or verifying at least one peak boundary of a compound of interest peak as specified herein above, and/or identifying and/or verifying peak identity and/or peak purity of a compound of interest peak as specified herein above.

As used herein, the term "allocating a sample for pooling" relates to assigning a fraction to become part of a future pool of purified or further purified compound of interest. In an embodiment, pooling includes the act of physically combining at least two separate fractions to form a pool; in view of the above, the term, however also includes redirecting a subportion of an eluate of an LC run, which may comprise several virtual fractions, into a pool. In an embodiment, the number of fractions to be pooled may also be one. The term "preliminarily allocating", as used herein, relates to a non-final assignment of a fraction; such preliminary allocation may be based on earlier instances of the same LC run, on analysis of an UV/VIS chromatogram of the LC run, and/or any other method deemed appropriate by the skilled person. After preliminary allocation, the fraction requires confirmation whether it shall be included into the pool, or not; such fraction may, in particular, be a fraction close to the expected start or end of a peak of the compound of interest. In an embodiment, there may be fractions for which a verification of assignment is not necessary, e.g., in case it is known that these fractions are uncritical with regards to interference; such samples may be finally allocated for pooling without verification. In such case, the pool obtained typically comprises the finally allocated and the verified allocated fractions. As the skilled person understands, pooling may also establish more than one pool of compound of interest; e.g., one pool of high purity and a second pool of lower purity may be generated, the second pool e.g., being used in a repetition of the same LC run or a in a another, non-identical separation method. In accordance with the above, the term "verified allocation" relates to a non-preliminary assignment of a fraction; this, in an embodiment, after a verified allocation, the fraction is included in the compound of interest pool.

In view of the above, the following embodiments are particularly envisaged:

Embodiment 1. A method for identifying and/or verifying at least one analyte peak in a chromatogram of a sample for said analyte from a liquid chromatography mass spectrometer device, said method comprising the following steps:

a) providing a chromatogram of the sample by acquiring a plurality of data points for quantifier signal intensities and/or qualifier signal intensities, over time; and, in case the sample comprises an internal standard, optionally providing, in an embodiment acquiring, a plurality of data points for internal standard quantifier signal intensities and/or internal standard qualifier signal intensities, over time;

b) determining for at least a fraction of the data points acquired in step a), a ratio type selected from the list consisting of (i) analyte quantifier to analyte qualifier ratios, (ii) internal standard quantifier to internal standard qualifier ratios, (iii) analyte quantifier to internal standard quantifier ratios, and (iv) analyte qualifier to internal standard qualifier ratios;

c) comparing the ratios determined in step b) to a reference; and d) identifying and/or verifying at least one analyte peak in a chromatogram based on comparison step c).

Embodiment 2. The method of embodiment 1, wherein said sample comprises an internal standard and wherein the method comprises the following steps:

a) providing a chromatogram of a sample by acquiring a plurality of data points for quantifier signal intensities and/or qualifier signal intensities, over time; and, optionally, providing, in an embodiment acquiring, a plurality of data points for internal standard quantifier signal intensities and/or internal standard qualifier signal intensities, over time;

b) determining for at least a fraction of the data points acquired in step a) a ratio type selected from the list consisting of (i) analyte quantifier to analyte qualifier ratios, (ii) internal standard quantifier to internal standard qualifier ratios, (iii) analyte quantifier to internal standard quantifier ratios, and (iv) analyte qualifier to internal standard qualifier ratios;

c) comparing the ratios determined in step b) to a reference; and d) identifying and/or verifying at least one analyte peak in a chromatogram based on comparison step c);

or wherein said sample does not comprise an internal standard and wherein the method comprises the following steps:

a) providing a chromatogram of a sample by acquiring a plurality of data points for quantifier and qualifier signal intensities over time;

b) determining analyte quantifier to analyte qualifier ratios for at least a fraction of the data points acquired in step a);

c) comparing the ratios determined in step b) to a reference; and d) identifying and/or verifying at least one analyte peak in a chromatogram based on comparison step c).

Embodiment 3. The method of embodiment 1 or 2, wherein providing a chromatogram is determining a chromatogram.

Embodiment 4. The method of any one of embodiments 1 to 3, wherein said method comprises further step a1) determining a putative lower peak boundary and/or a putative upper peak boundary corresponding to the analyte, and optionally determining a putative lower peak boundary and/or a putative upper peak boundary corresponding to the internal standard.

Embodiment 5. The method of any one of embodiments 1 to 4, wherein said putative lower peak boundary and/or a putative upper peak boundary is a pre-defined putative peak boundary, and/or wherein said putative lower peak boundary and/or putative upper peak boundary is determined based on the chromatogram, in an embodiment by conducting an automatic peak recognition.

Embodiment 6. The method of any one of embodiments 1 to 5, wherein said reference is a pre-determined reference value, reference range, or a reference score, in an embodiment is a pre-defined reference range.

Embodiment 7. The method of any one of embodiments 1 to 6, wherein said reference is or is calculated from a ratio pre-determined for the analyte and/or internal marker, in an embodiment the purified analyte and/or purified internal marker.

Embodiment 8. The method of embodiment 7, wherein said reference is said pre-determined ratio ±X, in an embodiment the pre-determined ratio for the purified analyte ±X, X being 100% of the pre-determined ratio, in an embodiment 50%, in a further embodiment 30%.

Embodiment 9. The method of any one of embodiments 1 to 8, wherein said identifying and/or verifying at least one analyte peak comprises identifying and/or verifying at least one putative peak boundary of an analyte peak.

Embodiment 10. The method of embodiment 9, wherein said fraction of the data points for which ratios are determined in step b) comprises data points downstream and/or upstream the peak boundary to be identified or verified.

Embodiment 11. The method of embodiment 9 or 10, wherein said peak boundary is identified and/or verified in case the ratio lies within a pre-defined reference range.

Embodiment 12. The method of any one of embodiments 9 to 11, wherein said peak boundary is identified and/or verified in case the ratio lies within a pre-defined reference range for a pre-defined fraction of data points, in an embodiment at least 3 out of 5 consecutive data points.

Embodiment 13. The method of any one of embodiments 9 to 12, wherein said peak boundary is identified and/or verified in case the average of said ratio over a multitude of n data points meets a pre-defined acceptance criterion, in an embodiment with n being at least two, in a further embodiment being at least three, in a further embodiment being at least four, in a further embodiment being at least five, in a further embodiment being at least seven, in a further embodiment being at least ten, data points.

Embodiment 14. The method of any one of embodiments 1 to 13, wherein said identifying and/or verifying at least one analyte peak comprises identifying and/or verifying peak identity and/or peak purity.

Embodiment 15. The method of any one of embodiments 1 to 14, wherein said fraction of the data points for which ratios are determined in step b) comprises data points between the putative lower peak boundary and the putative upper peak boundary.

Embodiment 16. The method of any one of embodiments 13 to 15, wherein peak identity and/or peak purity is verified in case the ratio lies within a pre-defined reference range.

Embodiment 17. The method of any one of embodiments 13 to 16, wherein peak identity is verified in case the ratio lies within a pre-defined reference range for a pre-defined fraction of data points.

Embodiment 18. The method of any one of embodiments 13 to 17, wherein peak identity is verified in case an average of said ratio over a multitude of n data points lies within a pre-defined reference range, in an embodiment with n being at least two, in a further embodiment being at least three, in a further embodiment being at least four, in a further embodiment being at least five, in a further embodiment being at least seven, in a further embodiment being at least ten, data points.

Embodiment 19. The method of any one of embodiments 13 to 16, wherein peak purity is verified in case the ratio lies within a pre-defined reference range for a pre-defined fraction of data points, in an embodiment at least 80% of data points analyzed between the putative lower peak boundary and/or a putative upper peak boundary, in an embodiment at least 90% of data points analyzed between the putative lower peak boundary and/or a putative upper peak boundary, in an embodiment at least 95% of data points analyzed between the putative lower peak boundary and/or a putative upper peak boundary, in an embodiment at least 80% of data points between the putative lower peak boundary and/or a putative upper peak boundary, in an embodiment at least 90% of data points between the putative lower peak boundary and/or a putative upper peak boundary, in an embodiment at least 95% of data points between the putative lower peak boundary and/or a putative upper peak boundary.

Embodiment 20. The method of any one of embodiments 13 to 16 or 19, wherein peak purity is verified in case an average of said ratio over a multitude of n data points meets a pre-defined acceptance criterion over at least 80% of data points between the putative lower peak boundary and/or a putative upper peak boundary, in an embodiment at least 90% of data points between the putative lower peak boundary and/or a putative upper peak boundary, in an embodiment at least 95% of data points between the putative lower peak boundary and/or a putative upper peak boundary; in an embodiment with n being at least two, in a further embodiment being at least three, in a further embodiment being at least four, in a further embodiment being at least five, in a further embodiment being at least seven, in a further embodiment being at least ten, data points.

Embodiment 21. The method of any one of embodiments 2 to 20, wherein said method further comprises determining a putative analyte peak area to internal standard peak area ratio (peak area ratio), wherein said method comprises determining analyte quantifier to internal standard quantifier ratios, or analyte qualifier to internal standard qualifier ratios, and wherein said identifying and/or verifying at least one analyte peak comprises identifying and/or verifying said peak area ratio.

Embodiment 22. The method of embodiment 21, wherein said fraction of the data points for which ratios are determined in step b) comprises data points between the putative lower peak boundary and the putative upper peak boundary.

Embodiment 23. The method of embodiment 21 or 22, wherein said putative peak area ratio is verified in case an average of said ratio calculated over at least 10% of data points between the putative lower peak boundary and/or a putative upper peak boundary, in an embodiment at least 50% of data points between the putative lower peak boundary and/or a putative upper peak boundary, in an embodiment at least 90% of data points between the putative lower peak boundary and/or a putative upper peak boundary, is within a range defined by said peak area ratio $\pm X$, X being 100% of the peak area ratio, in an embodiment 50%, in a further embodiment 30%.

Embodiment 24. The method of any one of embodiments 2 to 23, wherein said method comprises identifying and/or verifying at least one putative peak boundary of an analyte peak, a peak purity, and/or a putative peak area ratio.

Embodiment 25. The method of embodiment 24, wherein said method comprises determining analyte quantifier to internal standard quantifier ratios or analyte qualifier to internal standard qualifier ratios, and further comprises determining the distribution of said ratios, in an embodiment comprises determining the skewness and/or kurtosis of said data points, in an embodiment wherein said method is a method of verifying at least one putative peak boundary of an analyte peak, peak purity, and/or a putative peak area ratio.

Embodiment 26. The method of any one of embodiments 23 to 25, wherein at least one putative peak boundary of an analyte peak, a peak purity, and/or a putative peak area ratio is identified and/or verified in case the distribution of said ratios over a multitude of n data points meets a pre-defined acceptance criterion, in an embodiment with n being at least two, in a further embodiment n being at least three, in a further embodiment n being at least four, in a further embodiment n being at least five, in a further embodiment n being at least seven, in a further embodiment n being at least ten, data points.

Embodiment 27. A method of quality control of a liquid chromatography mass spectrometry (LC-MS) measurement of a sample, comprising the steps A) measuring said analyte in the sample of interest using the liquid chromatography mass spectrometer device and determining at least one chromatogram;

B) performing steps b) to d) of the method according to any one of embodiments 1 to 23, and C) evaluating quality of said LC-MS measurement based on the results of step B).

Embodiment 28. The method of embodiment 27, wherein at least one of i) marking the result of step A) as unreliable; ii) not outputting the result of step A), and (iii) initiating a re-run of said sample, optionally using a non-identical LC-MS protocol is performed in case at least one of a putative peak boundary, a peak identity, a peak purity, and a peak area ratio is not verified in step B).

Embodiment 29. The method according to any one of the preceding embodiments, wherein method steps b), c), and/or d), in an embodiment steps b) to d), are performed by a computer.

Embodiment 30. The method according to any one of the preceding embodiments, wherein said chromatography mass spectrometer device comprises a tandem mass spectrometer (MS/MS) unit.

Embodiment 31. A system for determining a concentration of at least one analyte in a sample comprising:

(I) at least one liquid chromatography mass spectrometer device, wherein the liquid chromatography mass spectrometer device is configured for measuring the analyte in the sample and for acquiring data points over time, in an embodiment for performing step a) of the method according to any one of embodiments 1 to 28; and (II) at least one evaluation device, wherein the evaluation device is configured for performing at least steps b), c) and/or d), in an embodiment all steps b) to d) of the method according to any one of embodiments 1 to 28.

Embodiment 32. The device according to the preceding embodiment, wherein the device is configured to perform the method for quality control according to any one of embodiments 27 to 30.

Embodiment 33. A computer or computer network comprising at least one processor, wherein the processor is adapted for performing at least steps b), c) and/or d), in an embodiment all steps b) to d) of the method according to any one of embodiments 1 to 28.

Embodiment 34. A computer loadable data structure that is adapted to perform at least steps b), c) and/or d), in an embodiment all steps b) to d) of the method according to any one of embodiments 1 to 28 while the data structure is being executed on a computer.

Embodiment 35. A computer program, wherein the computer program is adapted to perform at least steps b), c) and/or d), in an embodiment all steps b) to d) of the method according to any one of embodiments 1 to 28 while the program is being executed on a computer.

Embodiment 36. A computer program comprising program means for performing at least steps b), c) and/or d), in an embodiment all steps b) to d) of the method according to any one of embodiments 1 to 28 while the computer program is being executed on a computer or on a computer network.

Embodiment 37. A computer program comprising program means according to the preceding embodiment, wherein the program means are stored on a storage medium readable to a computer.

Embodiment 38. A storage medium, wherein a data structure is stored on the storage medium and wherein the data structure is adapted to perform at least steps b), c) and/or d), in an embodiment all steps b) to d) of the method according to any one of embodiments 1 to 28 after having been loaded into a main and/or working storage of a computer or of a computer network.

Embodiment 39. A computer program product having program code means, wherein the program code means can be stored or are stored on a storage medium, for performing at least steps b), c) and/or d), in an embodiment all steps b) to d) of the method according to any one of embodiments 1 to 28 when the program code means are executed on a computer or on a computer network.

Embodiment 40. A method for optimizing an analysis method for an analyte on an LC-MS device, comprising the steps of a) providing, in an embodiment determining, a chromatogram of a sample by acquiring a plurality of data points for quantifier signal intensities and qualifier signal intensities, over time;

b) determining a putative lower peak boundary, a putative upper peak boundary, a peak identity, and/or a peak purity;

c) verifying the putative lower peak boundary, the putative upper peak boundary, the peak identity, and/or the peak purity of step (b) by the method according to any one of embodiments 1 to 28;

d) modifying a sample pretreatment parameter, an LC parameter, and/or an MS parameter in case at least one of the putative lower peak boundary, the putative upper peak boundary, the peak identity, and/or the peak purity is not verified in step (c); and e) thereby optimizing the analysis method for the analyte.

Embodiment 41. A method for purifying a compound of interest from a preparative sample on an LC device, comprising a) separating constituents of said preparative sample by said LC device into fractions and preliminarily allocating one or more fractions for pooling;

b) recording an MS chromatogram of an aliquot of at least one of the fractions preliminarily allocated for pooling in step a);

c) verifying allocation of said at least one fraction of step b) for pooling by the method according to the method for identifying and/or verifying at least one analyte peak;

d) including samples with a verified allocation in the pooling of the fractions comprising the compound; and e) thereby purifying said compound of interest.

Embodiment 42. The subject matter of any of the preceding embodiments, wherein the values of the quantifier signal intensities, qualifier signal intensities, internal standard quantifier signal intensities, and/or internal standard qualifier signal intensities are single-cycle signal intensities or values derived therefrom by standard mathematical operations, in an embodiment are single-cycle signal intensities.

All references cited in this specification are herewith incorporated by reference with respect to their entire disclosure content and the disclosure content specifically mentioned in this specification.

In order that the embodiments of the present disclosure may be more readily understood, reference is made to the following examples, which are intended to illustrate the disclosure, but not limit the scope thereof.

Example 1: Serum samples spiked with a mixture containing benzoylecgonine, clonazepam, and EDDP as well as their ISTDs (internal standards) benzoylecgonine-13C6, clonazepam-d4 and EDDP-d3 were measured by LC-MS. The single data points were read from MS raw data and retention times of the transitions were aligned for each analyte/ISTD combination. Table 1 below summarizes the calculations by peak integration and single cycle ratios and their deviations to the respective target value as well as the accepted ranges.

TABLE 1

Calculations of the peak boundaries, quantifier/qualifier ratios and
analyte/internal standard (ISTD) ratios by peak integration and
single cycle ratios and their deviations to the target value;
indications in bold relate to non-verified results

| | Target value | by peak integration | by single cycle ratios | Δ to target value or verification status |
|---|---|---|---|---|
| Benzoylecgonine | | | | |
| Peak boundary start | 100 ± 30% | 8,078 ms | 0 of 5 | not verified |
| Peak boundary end | 100 ± 30% | 12,590 ms | 4 of 5 | verified |
| Quantifier/qualifier ratio | 4.03 ± 10% | 4.12 | 4.05 | 2.2%/0.5% |
| Analyte/ISTD ratio | 42.53 ± 10% | 46.62 | 42.27 | 12.0%/−0.6% |
| Clonazepam | | | | |
| Peak boundary start | 100 ± 30% | 11,956 ms | 5 of 5 | verified |
| Peak boundary end | 100 ± 30% | 18,557 ms | 4 of 5 | verified |
| Quantifier/qualifier ratio | 1.15 ± 10% | 1.16 | 1.14 | 0.9% ./−0.9% |
| Analyte/ISTD ratio | 4.30 ± 10% | 4.03 | 4.63 | −6.3% ./7.7% |
| EDDP | | | | |
| Peak boundary start | 100 ± 30% | 43,664 ms | 4 of 5 | verified |
| Peak boundary end | 100 ± 30% | 56,774 ms | 4 of 5 | verified |
| Quantifier/qualifier ratio | 4.64 ± 10% | 4.75 | 4.54 | 2.4% ./−2.2% |
| Analyte/ISTD ratio | 14.08 ± 10% | 14.14 | 14.28 | 0.4% ./1.4% |

Figure 1B:
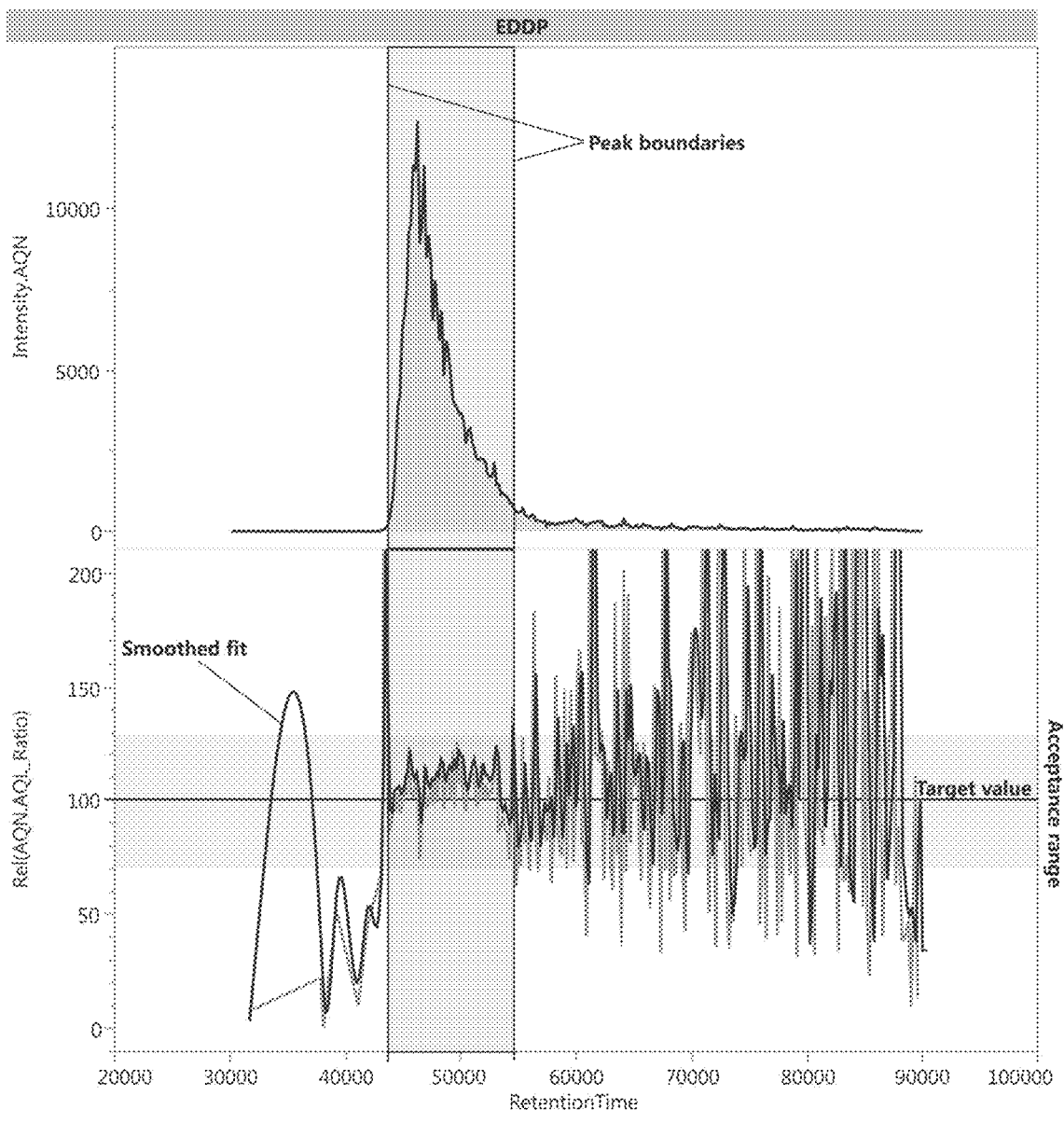
Figure 2:
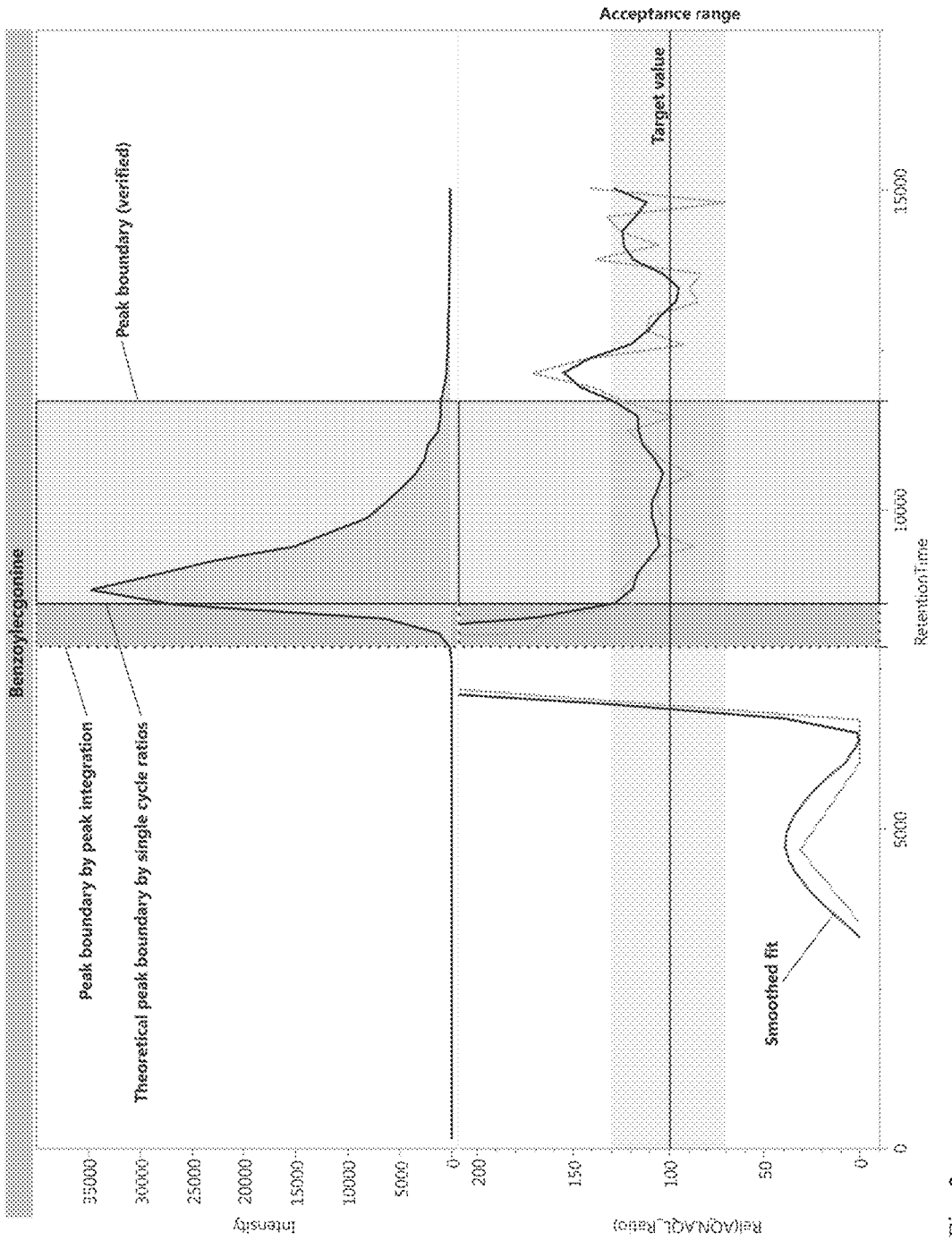
FIG. 2 shows the chromatogram of benzoylecgonine with its quantifier/qualifier ratio blot.

Example 2: The quantifier/qualifier single cycle ratios of Example 1 were calculated in relation to their target value. FIG. 1 shows the chromatograms of clonazepam and EDDP with their quantifier/qualifier ratio blots, FIG. 2 that of benzoylecgonine. For verifying the peak boundaries, the five consecutive single cycle ratios around the detected peak boundaries of 8,078 and 12,590 ms for benzoylecgonine, 11,956 and 18,557 ms for clonazepam, and 43,664 and 56,774 ms for EDDP were monitored. The numbers of smoothed data points, meeting the acceptance range of ±30% error of the target value, were counted. A number of at least three out of five data points within the acceptance range led to verification. The peak boundaries determined by peak integration could all be verified, except for the peak start boundary of benzoylecgonine which differed significantly.

Example 3: The significant deviation of the peak start boundary for benzoylecgonine in Example 2 with the high alteration of the quantifier/qualifier single cycle ratios within this measure led to the assumption of an underlying interference by a co-eluting compound near the peak start boundary. Such a co-eluting interference could not be monitored by any peak shape parameter as it did not obviously affect the peak curve. Nevertheless, the medians of the single cycle ratios within the peak boundaries, which were calculated in addition, could verify interference close to peak start by comparison to the respective target value.

Example 4: The analyte/ISTD single cycle ratios were determined and the medians thereof within the peak boundaries were calculated. In comparison to the peak area ratios determined by peak integration, the amounts determined for all compound could be verified except for benzoylecgonine. This result again led to the assumption of an interfering substance under the peak of benzoylecgonine and was thus in line with the assumption described in Example 3. This interference directly affects the final result, i.e., the concentration of benzoylecgonine measured, and cannot not be monitored by traditional parameters, including the quantifier/qualifier peak area ratio, causing a risk of overlooking the interference.

Example 5: Serum samples spiked with a mixture containing testosterone and epitestosterone as well as the ISTD (internal standard) testosterone-13C3 were measured by LC-MS in six different LC-protocols and six analytical replicates. The single data points were read from MS raw data and retention times of the transitions were aligned for the analyte/ISTD combination.

Figure 3:
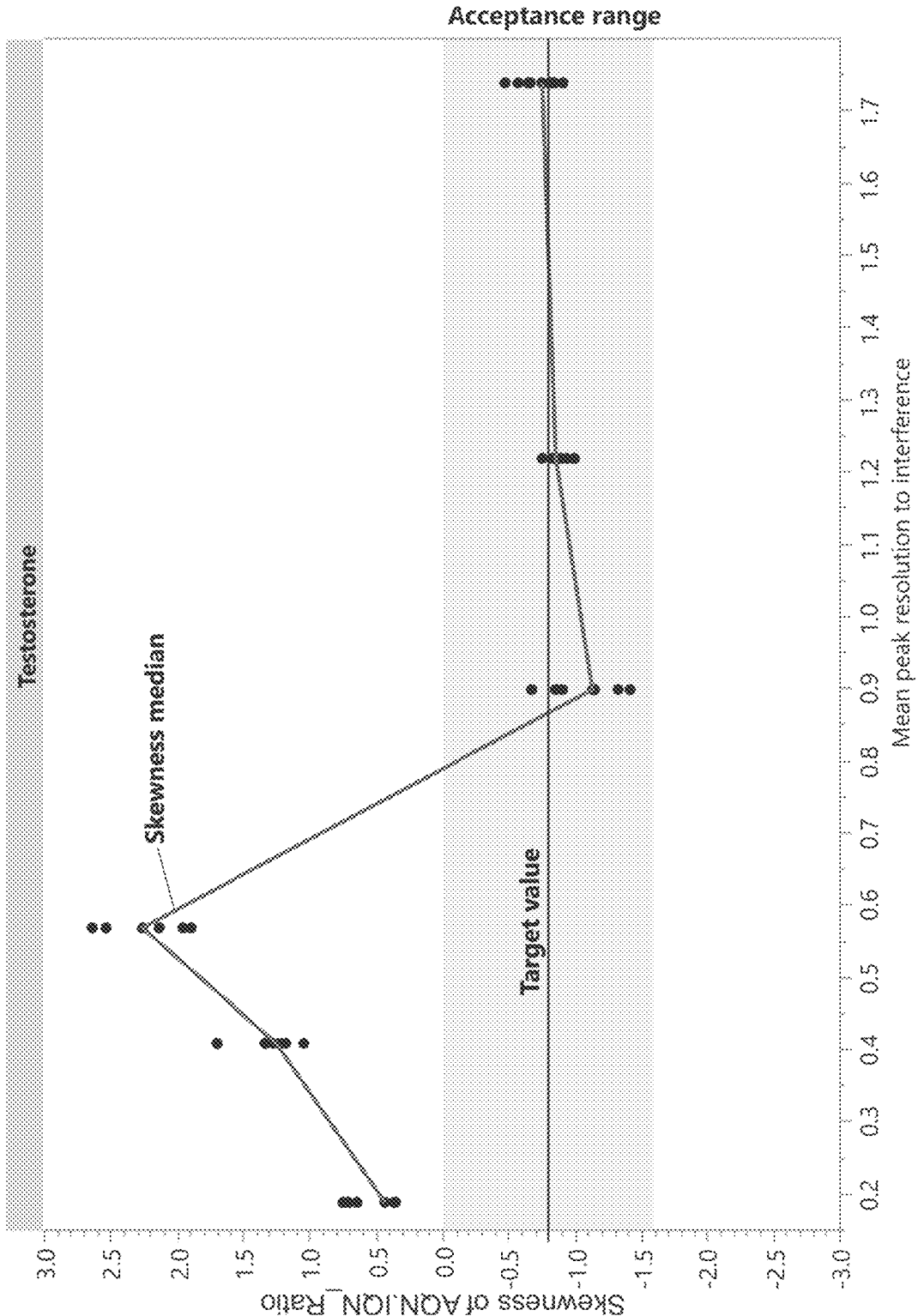
FIG. 3 shows a skewness blot of the analyte quantifier to internal standard single cycle ratios for testosterone in different peak resolutions of the isobaric interference epitestosterone.

Example 6: The analyte/ISTD single cycle ratio skewness of Example 5 were calculated and monitored for verifying peak identity and/or purity of the samples. FIG. 3 shows a skewness blot of the analyte/ISTD single cycle ratios for testosterone in different peak resolutions of the isobaric interference epitestosterone together with the respective target value and accepted ranges. Skewness values meeting the acceptance range of ±100% error of the target value led to verification. The peak identity and/or purity could be verified for samples measured in LC protocol one, two and three. For samples measured in LC protocol four, five and six, the skewness values were out of acceptance range and thus, peak identity and/or purity could not be verified in those samples.

Example 7: The samples not verified in Example 6 by deviating analyte/ISTD single cycle ratio skewness in their distribution led to the assumption of an underlying interference by a co-eluting compound. In addition, the mean peak resolutions between testosterone and epitestosterone (as interference) were estimated for each LC-protocol and sample. In all samples with mean peak resolutions equal or above 0.9, the peak identity and/or purity could be verified by the corresponding skewness, in those samples with values below 0.9, the peak identity and/or purity could not be verified. These observations confirmed the assumption of the presence of an co-eluting interference, in this example epitestosterone, in those samples.

What is claimed is:

1. A method for identifying and/or verifying at least one analyte peak in a chromatogram of a sample for said analyte from a liquid chromatography mass spectrometer device, said method comprising the following steps:

a) determining or have determined a chromatogram of the sample by performing at least one chromatography run on the sample by a liquid chromatography device configured to separate the analyte of the sample from other components of the sample for detection, coupled to a mass spectrometry device through an interface that includes an ionization source configured to generate molecular ions and transfer the molecular ions to a gas phase, and by acquiring a plurality of data points for quantifier signal intensities and/or qualifier signal intensities, over time; and, in case the sample comprises an internal standard, optionally acquiring a plurality of data points for internal standard quantifier signal intensities and/or internal standard qualifier signal intensities, over time, wherein the values of the quantifier signal intensities, qualifier signal intensities, internal standard quantifier signal intensities, and/or internal standard qualifier signal intensities are single-cycle intensities or values derived therefrom;

b) determining for at least a fraction of the data points acquired in step a), a ratio type selected from the list consisting of (i) analyte quantifier to analyte qualifier ratios, (ii) internal standard quantifier to internal standard qualifier ratios, (iii) analyte quantifier to internal standard quantifier ratios, and (iv) analyte qualifier to internal standard qualifier ratios;

c) comparing the ratios determined in step b) to a reference; and d) identifying and/or verifying at least one analyte peak in a chromatogram based on comparison step c).

2. The method of claim 1, wherein said sample comprises an internal standard and wherein the method comprises the following steps:

a) providing a chromatogram of a sample by acquiring a plurality of data points for quantifier signal intensities and/or qualifier signal intensities, over time; and, optionally, acquiring a plurality of data points for internal standard quantifier signal intensities and/or internal standard qualifier signal intensities, over time;

b) determining for at least a fraction of the data points acquired in step a) a ratio type selected from the list consisting of (i) analyte quantifier to analyte qualifier ratios, (ii) internal standard quantifier to internal standard qualifier ratios, (iii) analyte quantifier to internal standard quantifier ratios, and (iv) analyte qualifier to internal standard qualifier ratios;

c) comparing the ratios determined in step b) to a reference; and d) identifying and/or verifying at least one analyte peak in a chromatogram based on comparison step c);
or wherein said sample does not comprise an internal standard and wherein the method comprises the following steps:

a) providing a chromatogram of a sample by acquiring a plurality of data points for quantifier and qualifier signal intensities over time;

b) determining analyte quantifier to analyte qualifier ratios for at least a fraction of the data points acquired in step a);

c) comparing the ratios determined in step b) to a reference; and d) identifying and/or verifying at least one analyte peak in a chromatogram based on comparison step c).

3. The method of claim 1, wherein said method further comprises step a1) determining a putative lower peak boundary and/or a putative upper peak boundary corresponding to the analyte.

4. The method of claim 3, wherein said method further comprises optionally determining a putative lower peak boundary and/or a putative upper peak boundary corresponding to the internal standard.

5. The method of claim 1, wherein said reference is or is calculated from a ratio pre-determined for the analyte and/or internal marker.

6. The method of claim 5, wherein the analyte is a purified analyte and/or the internal marker is a purified internal marker.

7. The method of claim 1, wherein said identifying and/or verifying at least one analyte peak comprises identifying and/or verifying at least one putative peak boundary of an analyte peak.

8. The method of claim 7, wherein said fraction of the data points for which ratios are determined in step b) comprises data points downstream and/or upstream the putative peak boundary to be identified or verified, and/or wherein said putative peak boundary is identified and/or verified in case the ratio lies within a pre-defined reference range for a pre-defined fraction of data points.

9. The method of claim 8, wherein said pre-defined fraction of data points comprises at least 3 out of 5 consecutive data points.

10. The method of claim 1, wherein said identifying and/or verifying at least one analyte peak comprises identifying and/or verifying peak identity and/or peak purity.

11. The method of claim 10, wherein said peak identity and/or said peak purity is verified in case the ratio lies within a pre-defined reference range.

12. The method of claim 2, wherein said method further comprises determining a putative analyte peak area to internal standard peak area ratio (peak area ratio), wherein said method comprises determining analyte quantifier to internal standard quantifier ratios, or analyte qualifier to internal standard qualifier ratios, and wherein said identifying and/or verifying at least one analyte peak comprises identifying and/or verifying said peak area ratio.

13. The method of claim 1, wherein said fraction of the data points for which ratios are determined in step b) comprises data points between the putative lower peak boundary and the putative upper peak boundary.

14. The method of claim 1, wherein said method comprises identifying and/or verifying at least one putative peak boundary of an analyte peak, a peak purity, and/or a putative peak area ratio, comprises determining analyte quantifier to internal standard quantifier ratios or analyte qualifier to internal standard qualifier ratios, and further comprises determining the distribution of said ratios.

15. The method of claim 14, wherein at least one putative peak boundary of an analyte peak, a peak purity, and/or a putative peak area ratio is identified and/or verified in case the distribution of said ratios over a multitude of n data points meets a pre-defined acceptance criterion.

16. The method of claim 15, wherein n is at least two data points.

17. The method of claim 15, wherein n is at least three data points.

18. The method of claim 15, wherein n is at least four data points.

19. The method of claim 15, wherein n is at least five data points.

20. The method of claim 15, wherein n is at least seven data points.

21. The method of claim 15, wherein n is at least ten data points.

22. The method of claim 14, wherein said putative peak area ratio is verified in case an average of said ratio calculated over at least 10% of data points between the putative lower peak boundary and/or a putative upper peak boundary is within a range defined by a reference peak area ratio ±30%.

23. A method of quality control of a liquid chromatography mass spectrometry (LC-MS) measurement of a sample, comprising the steps:

A) measuring said analyte in the sample of interest using the liquid chromatography mass spectrometer device and determining at least one chromatogram;

B) performing steps b) to d) of the method according to claim 1, and

C) evaluating quality of said LC-MS measurement based on the results of step B).

24. A system for determining a concentration of at least one analyte in a sample comprising:

(I) at least one liquid chromatography mass spectrometer device, wherein the liquid chromatography mass spectrometer device is configured for measuring the analyte in the sample and for acquiring data points over time; and (II) at least one evaluation device, wherein the evaluation device is configured for performing at least steps b), c) and/or d), of the method according to claim 1.

25. The system of claim 24, wherein the liquid chromatography mass spectrometer device is configured to determine a chromatogram of the sample by acquiring a plurality of data points for quantifier signal intensities and/or qualifier signal intensities, over time; and, in case the sample comprises an internal standard, optionally acquiring a plurality of data points for internal standard quantifier signal intensities and/or internal standard qualifier signal intensities, over time.

26. The system of claim 25, wherein the evaluation device is configured to determine for at least a fraction of the data points, a ratio type selected from the list consisting of (i) analyte quantifier to analyte qualifier ratios, (ii) internal standard quantifier to internal standard qualifier ratios, (iii) analyte quantifier to internal standard quantifier ratios, and (iv) analyte qualifier to internal standard qualifier ratios; compare the ratios determined to a reference; and identify and/or verify at least one analyte peak in a chromatogram based on comparison.

* * * * *